W. R. LAZENBY.
TRAP ANCHOR.
APPLICATION FILED MAR. 10, 1920.
1,368,813. Patented Feb. 15, 1921.
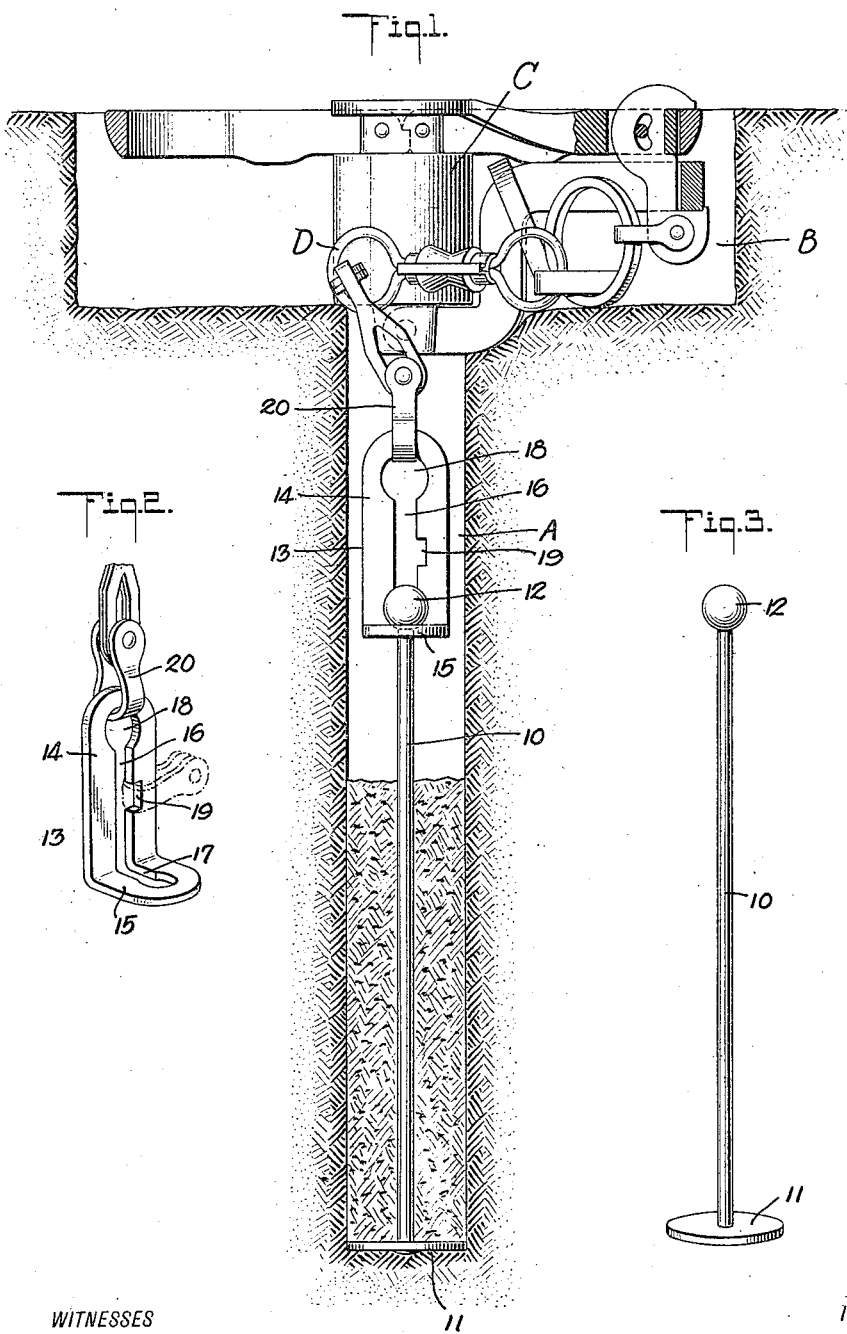
WITNESSES
Frederick Diehl.
Hugh H. Ott
INVENTOR
W. R. LAZENBY
BY Munn & Co
ATTORNEYS

UNITED STATES PATENT OFFICE.

WILLIAM R. LAZENBY, OF HARDIN, MONTANA, ASSIGNOR OF ONE-HALF TO FRANK CLARK, OF HARDIN, MONTANA.

TRAP-ANCHOR.

1,368,813.

Specification of Letters Patent.  Patented Feb. 15, 1921.

Application filed March 10, 1920. Serial No. 364,783.

*To all whom it may concern:*

Be it known that I, WILLIAM R. LAZENBY, a citizen of the United States, and resident of Hardin, in the county of Big Horn and State of Montana, have invented a new and Improved Trap-Anchor, of which the following is a full, clear, and exact description.

This invention relates to anchors and particularly to anchors for use in connection with animal traps and the like.

One of the principal objects of the present invention is to provide an anchoring means which is designed as a substitute for posts or stakes usually employed for this purpose.

Another object of the invention is to provide a simple and efficient anchor including separable means which permits of a quick attachment or detachment of the trap and which eliminates any possibility of an accidental separation of the parts when once associated.

Another object of the invention is to provide a trap anchoring device which is especially designed and constructed to permit of the application of the same within a depression whereby the chain secured to the trap may be normally nested in said depression in an out of the way position, the special construction of attaching means for associating the chain permitting of relative sliding movements being employed for the purpose.

A still further object of the invention is to provide a device for detachably anchoring a trap chain to the ground in which one of the chain links serves as a means for preventing the separation of an attaching member from an anchoring member.

With these and other objects in view which will be more clearly pointed out hereafter, reference is made to the accompanying drawings forming a part of this application, in which—

Figure 1 is a view illustrating the device in its applied position for anchoring a trap.

Fig. 2 is a perspective view of the attaching member.

Fig. 3 is a perspective view of the anchoring member.

Referring to the drawings by characters of reference which designate like parts throughout the several views thereof, A represents a well formed by driving a stake or other implement into the ground and B a concentric depression adapted to receive the trap proper. The trap C may be of any construction, the form shown being merely illustrative of one type which may be employed. An anchoring chain D is provided and has one extremity secured to the trap. The anchoring device includes an anchoring member comprising a rod 10 provided at its lower end with an anchor plate or disk 11 adapted to be positioned at the bottom of the well A and covered with earth which is filled into the well and tamped over the plate and around the major portion of the rod 10. The opposite end of the rod which projects from the filled in earth is provided with a spherical head 12. An attaching member 13 is preferably in the nature of a metallic plate having angular portions 14 and 15 which are provided with communicating slots 16 and 17. An enlarged opening 18 is provided at the free end of the slot 16 and an enlarged offset notch 19 is provided in the slot 16 adjacent thereto. In practice one of the links of the chain D, preferably the end link 20 of the free terminal of the chain is received by the slot 16 and is normally arranged in the enlarged opening 18.

In use of the device when it is desired to detach the attaching member 13 from the exposed portion of the rod 10, the link 20 is shifted from the enlarged opening 18 and positioned in the notch 19 as illustrated in dotted lines in Fig. 2 of the drawing. The attaching member 13 may then be shifted throughout the length of the slots 16 and 17 until the enlarged opening 18 registers with the spherical head 12 permitting of the removal of the attaching member from the anchoring member. In applying the attaching member the link 20 is first shifted into the offset portion or notch 19 and the enlarged opening 18 passed over the head, the plate is moved over the rod until the same engages the closed end of the slot 17. The link 20 is then shifted to lie within the enlarged opening 18 and when in this position the same serves to prevent the removal of the attaching member from the anchoring member. In some instances where it is desired to permanently lock the attaching member on the anchoring member a pad lock may be inserted in the enlarged opening 18 or the portions of the member 13 lying on the opposite sides of the slot may be hammered together to reduce the size of the slots. The construction of the attaching member and the anchoring member provide means for swiveling the ends of the chain when attached.

While there has been illustrated and described a single and preferred embodiment of the invention, it is to be understood that the same is merely illustrative and that no limitation is necessarily made to the precise details of construction as modifications and variations which fall within the scope of the claims may be resorted to when found expedient.

Having thus described my invention, what I claim as new and desire to secure by Letters Patent, is—

1. A device for detachably anchoring a trap chain to the ground comprising an anchor member adapted to be buried in the ground with an exposed headed extremity projecting therefrom, and an attaching member having a slot adapted to receive one of the links of the trap chain, said link being adjustable in the slot to respectively permit of the insertion and removal of the attaching member from the anchoring member.

2. In an animal trap having a chain secured thereto, the combination with a member having one end adapted to be anchored in the ground with an exposed portion projecting therefrom, an enlarged head at the free extremity of said exposed portion, of means for detachably associating the free extremity of the trap chain therewith, said means comprising a plate carried by the free extremity of said chain having slotted portions therein whereby upon adjustments of the chain extremity therein insertion and removal of the plate from the head is permitted.

3. In an animal trap having a chain secured thereto, the combination with a member having one end adapted to be anchored in the ground with an exposed portion projecting therefrom, an enlarged head at the free extremity of said exposed portion, of means for detachably associating the free extremity of the trap chain therewith, said means comprising a plate having slotted portions therein adapted to receive the free extremity of the chain, said free extremity being adjustable therein to permit of the application and removal of the slotted portions from the head.

4. A device for removably securing the chain of a trap to a trap anchoring member having a reduced neck and an enlarged head, comprising a plate having a key hole slot therein provided with an offset portion, said slot adapted to permanently receive a link of the chain, said link being shiftable in the slot to permit of the positioning of the same in the offset portion for allowing of free movements of the restricted portion of the key hole slot over the reduced neck whereby the removal of the plate from the anchoring member may be effected.

5. The combination with a trap anchoring device including an anchor disk, a rod secured thereto and an enlarged retaining head of means for detachably associating a trap chain therewith comprising a plate having a key hole slot adapted to receive one of the links of the chain, said slot having an offset portion constituting means whereby upon shifting of the link into said offset portion, the plate can be shifted on the rod to effect the removal of the same therefrom.

6. In a trap anchoring device, an anchoring member comprising a rod provided at its opposite extremities with an anchor disk and an enlarged head, an attaching member comprising a plate having slotted portions adapted to receive one of the links of the chain attached to a trap, the said link being shiftable in the slotted portions to obstructing and non-obstructing positions to respectively permit of or prevent the removal of the attaching member from the anchoring member.

7. In a trap anchor, a rod, a disk-like anchoring head in one extremity thereof, a spherical head at the opposite end, an angle plate having a slot throughout its length and provided with a large opening communicating with one extremity of the slot, the said slot being of a width corresponding to the diameter of the rod and the said opening of a diameter to permit of the passage of the spherical head therethrough when applying or removing the angle plate to the rod, said slot having a notch adjacent the enlarged opening, in combination with a chain adapted to be secured at one end to a trap and having one of its links normally arranged in the enlarged opening to obstruct the passage of the spherical head therethrough, said link being adapted to be shifted and positioned in the notch to permit of movement of the rod throughout the length of the slot and the passage of the spherical head therethrough.

WILLIAM R. LAZENBY.